(12) United States Patent
Bonnebat et al.

(10) Patent No.: US 6,592,701 B1
(45) Date of Patent: Jul. 15, 2003

(54) METHOD AND DEVICE FOR CONTINUOUS COATING OF AT LEAST ONE METAL STRIP WITH A FLUID CROSS-LINKABLE POLYMER FILM

(75) Inventors: Claude Bonnebat, Pontault Combault (FR); Olivier Brun, La Courneuve (FR); Thierry Soas, Chantilly (FR)

(73) Assignee: Sollac, Puteaux (FR)

(*) Notice: Subject to any disclaimer, the term of this patent is extended or adjusted under 35 U.S.C. 154(b) by 0 days.

(21) Appl. No.: 09/463,949

(22) PCT Filed: Aug. 6, 1998

(86) PCT No.: PCT/FR98/01759

§ 371 (c)(1),
(2), (4) Date: Mar. 6, 2000

(87) PCT Pub. No.: WO99/07480

PCT Pub. Date: Feb. 18, 1999

(30) Foreign Application Priority Data

Aug. 8, 1997 (FR) ............................. 97 10232

(51) Int. Cl.$^7$ ............................................. B29C 47/00
(52) U.S. Cl. .............. 156/244.11; 156/324; 427/318; 427/428; 118/244
(58) Field of Search ................. 427/318, 211, 427/428; 118/244, 230, 249, 258; 156/244.11, 244.23, 244.24, 324, 555

(56) References Cited

U.S. PATENT DOCUMENTS 3,511,696 A * 5/1970 Murray ..................... 118/244
3,539,384 A * 11/1970 Kolesinskas ................ 427/428
5,281,435 A * 1/1994 Buecher ..................... 427/318
5,407,702 A * 4/1995 Smith et al. ................ 427/211
5,755,883 A * 5/1998 Kinose et al. .............. 118/244
5,846,599 A * 12/1998 Innes et al. ................. 427/318

FOREIGN PATENT DOCUMENTS

GB            981626        * 1/1965 ................ 427/318

* cited by examiner

Primary Examiner—Michael W. Ball
Assistant Examiner—John L. Goff
(74) Attorney, Agent, or Firm—Oblon, Spivak, McClelland, Maier & Neustadt, P.C.

(57) ABSTRACT

A method for the continuous coating of at least one metal strip with a fluid, crosslinkable polymer film free from solvent or diluent and having a thickness less than that of the metal strip. The process firs continuously moves the metal strip on at least one support roller, pre-heats the strip, forms by forced flow, on a pinch roller on a lap of the crosslinkable polymer, heats and drives in rotation the pinch roller in the same direction as the support roller, and forms the crosslinkable film by compressing, between the pinch roller and the metal strips, an applicator element with a deformable surface, heated and driven in rotation in the same direction as the support roller to transfer the film from the pinch roller onto the applicator element and from the applicator element onto a metal strip. A coating device for implementing this method is also disclosed.

3 Claims, 3 Drawing Sheets

METHOD AND DEVICE FOR CONTINUOUS COATING OF AT LEAST ONE METAL STRIP WITH A FLUID CROSS-LINKABLE POLYMER FILM

FIELD OF THE INVENTION

The subject of the present invention is a process and an apparatus for the continuous coating of at least one metal strip with a thin fluid film of crosslinkable polymer containing neither solvent nor diluent.

DISCUSSION OF THE BACKGROUND

Thermally crosslinkable polymers such as, for example, thermosetting polymers, or physically crosslinkable polymers such as, for example, photocurable polymers, are known.

Various processes are known for applying a thermoplastic or thermosetting organic coating to a bare or coated metal strip.

The application of organic coatings such as, for example, liquid paints or varnishes is usually carried out by roller coating these liquid coatings in the state of a solution or of a dispersion in an aqueous or solvent medium.

To do this, the liquid coating is deposited on a metal strip by predosing the solution or dispersion using a system comprising two or three rollers and by transferring some or all of this liquid coating thus predosed onto an applicator roller in contact with the surface of the metal strip to be coated.

The transfer is performed either by friction of the applicator roller on the metal strip, the two surfaces in contact running in opposite directions, or by contact in the same direction.

An advantageous trend in the technology of continuous application of crosslinkable polymer coatings, such as thermosetting paints or varnishes for example, to a metal strip consists in depositing this coating without the use of a solvent or a diluent.

To apply such coatings, several techniques are known at the present time.

The first consists in applying the organic coating in the form of a powder.

Another technique for applying a liquid coating to a metal strip is known, this technique using a heating tank, usually called a melting kettle, provided in its lower part with an orifice from which the liquid polymer contained in the tank flows.

Placed below this tank are two parallel rolls in contact with each other and the metal strip to be coated moves along beneath these rolls.

The liquid polymer is poured into the nip of the rolls, then flows between the said rolls and is deposited on the metal strip.

However, this technique has drawbacks stemming from the fact that the polymer can be only slightly reactive on account of its relatively long storage time in the heating tank and from the fact that it does not allow the thickness of the coating film on the metal strip to be controlled and consequently does not allow a thin homogeneous coating to be obtained.

Another technique consists in using the extrusion of the organic coating in the fluid state and in applying this coating to a substrate by extrusion coating or by lamination.

It is common practice to apply a thin organic coating, particularly of thermoplastic polymers, by extrusion coating to flexible substrates, such as paper, plastic films, textiles or even thin metal substrates, such as packaging materials.

The molten coating is transferred by means of a rigid sheet die positioned in direct contact with the substrate and the thickness of this coating does not depend on the die aperture but only on the flow rate of molten material through the section of the said die and on the speed of the substrate.

This technique requires there to be perfect parallelism between the edges of the die and the substrate.

In addition, the pressure exerted by the die on the substrate derives only from the viscosity of the molten material so that any possibility of correcting the discrepancies in flatness of the substrate, by pressing the latter against the back-up roll, is very limited.

The technique of extrusion lamination of a uniform layer of fluid coating on a substrate uses the drawing beneath the die of a fluid sheet at the exit of a sheet die, this sheet then being pressed against the substrate with the aid, for example, of a cold roller or of a rotating bar, or else by an air knife or an electrostatic field.

In this case, the thickness of the fluid sheet is controlled by the flow rate of the material in the die section and by the speed of the substrate.

In order to prevent the fluid sheet from sticking on the pressing roller, the latter must have a perfectly smooth and cooled surface.

In addition, the pressing pressure must however be low enough to prevent the formation of a calendering bead and consequently, this mode of transfer does not make it possible to compensate for any thickness variations and discrepancies in flatness in the case of a rigid substrate.

This technique of applying the coating with the formation of a free strand at the exit of the extrusion die makes it possible to avoid the problems of coupling between the die and the rigid substrate, but it causes application instabilities if the length of the free strand fluctuates.

In general, in the various known techniques mentioned above, the continuous application of a thin organic coating to metal substrates is carried out with low contact pressures, insufficient to allow production of a thin uniform coating applied homogeneously to rigid substrates which may have flatness and thickness-heterogeneity discrepancies.

These various application techniques do not make it possible to compensate for the variations in thickness of the metal substrate, which variations consequently cause unacceptable fluctuations in the thickness of the coating, especially if the substrate is formed by a metal strip which exhibits significant surface roughness and/or corrugations of amplitude equal to or greater than the thickness of the coating to be produced on the said metal strip.

Moreover, these various application techniques do not make it possible to allow for variations in the width of the substrate nor variations in the transverse positioning of this substrate, so that the coating cannot be deposited uniformly over the entire width of the said substrate.

Finally, during application of the coating, air microbubbles may be trapped between the coating and the substrate, which is to the detriment of homogeneous application and to the surface appearance of this coating and which, in some applications, causes rapid corrosion of the substrate at these air microbubbles.

Moreover, EP-A-0,593,708 discloses an apparatus for coating a running metal strip in which this metal strip passes over a back-up roll and is in contact with an applicator roll at the surface of which a fluid coating agent is deposited.

The applicator roll is driven in rotation in an opposite direction to the direction in which the strip runs, and this roll is made of metal.

This apparatus has drawbacks.

This is because, given the nature of the material of which the applicator roll is made, this apparatus does not allow homogeneous pressure to be applied at all the points of application of the film to the metal strip between the two rollers when the surface of this metal strip is excess reliefs, that is to say exhibits roughness and/or corrugations which are equivalent to or greater than the thickness of the coating film to be deposited.

This is because the surface hardness of the applicator roller does not allow the pressure to be applied and distributed uniformly and locally to the strip and there is even the risk of the coating film spreading, to the detriment of the homogeneity of its

SUMMARY OF THE INVENTION

Consequently, the continuous application of a thin uniform coating of crosslinkable polymer to a metal strip therefore causes problems because this metal strip has flatness and thickness discrepancies as well as significant roughness and/or corrugations of amplitude equal to or greater than the thickness of the coating film to be deposited on the said strip, even when this strip is pressed with a high force against a uniform roll.

The object of the invention is to avoid these drawbacks by providing a process and an apparatus for the continuous coating of at least one metal strip with a thin fluid film of crosslinkable polymer containing neither solvent nor diluent, making it possible to obtain a coating of uniform thickness of a few microns applied homogeneously to this strip, while preventing air microbubbles from being trapped between the film and the metal strip and obviating discrepancies in the flatness and roughness of this strip as well as allowing application on part or all of the coating, despite the fluctuations in width and transverse positioning of this strip.

The subject of the invention is therefore a process for the continuous coating of at least one metal strip with a fluid film of crosslinkable polymer containing neither solvent nor diluent and with a thickness of less than that of the metal strip, characterized in that:

the metal strip is made to run continuously over at least one back-up roll;

the said metal strip is preheated to a temperature approximately equal to or greater than the temperature of the fluid film of crosslinkable polymer and equal to or greater than the softening temperature of this crosslinkable polymer;

a homogeneous and uniformly thick sheet of the said crosslinkable polymer is formed, by forced flow, on a pinch roll having a hard surface, the said crosslinkable polymer having a viscosity greater than 10 Pa.s under the conditions of formation of the said sheet, the said pinch roll being heated to a temperature approximately equal to or greater than the temperature of the said sheet and equal to or greater than the softened temperature of this crosslinkable polymer and being driven in rotation in the same direction as the back-up roll supporting the metal strip, and the film of crosslinkable polymer is formed with a uniform thickness approximately equal to the desired thickness;

an applicator element having a deformable surface is compressed between the pinch roll and the metal strip, the said applicator element being heated to a temperature approximately equal to or greater than the temperature of the pinch roll and being driven in rotation in the same direction as the back-up roll supporting the metal strip, in order to transfer this film firstly from the pinch roll onto the applicator element and secondly from the said applicator element onto the metal strip and to obtain a coating of homogeneous thickness.

BRIEF DESCRIPTION OF THE FIGURES

The subject of the invention is also an apparatus for the continuous coating of at least one metal strip with a thin fluid film of crosslinkable polymer containing neither solvent nor diluent and with a thickness of less than that of the metal strip, characterized in that it comprises:

means for continuously driving the metal strip;

at least one back-up roll supporting the metal strip;

means for preheating the metal strip to a temperature equal to or greater than the temperature of the fluid film of crosslinkable polymer and equal to or greater than the softening temperature of this crosslinkable polymer;

means for forming, on a pinch roll having a hard surface, by forced flow, a homogeneous and uniformly thick sheet of the said crosslinkable polymer having a viscosity greater than 10 Pa.s under the conditions of formation of the said sheet, the said pinch roll forming the film of crosslinkable polymer with a uniform thickness approximately equal to the desired thickness and being heated to a temperature approximately equal to or greater than the temperature of the said sheet and equal to or greater than the softening temperature of this crosslinkable polymer and being driven in rotation in the same direction as the back-up roll supporting the metal strip;

and an applicator element having a deformable surface, the said applicator element being compressed between the take-up roll and the metal strip, heated to a temperature approximately equal to or greater than the temperature of the pinch roll and driven in rotation in the same direction as the back-up roll supporting the metal strip, in order to transfer the said film firstly from the pinch roll onto this applicator element and secondly from the said applicator element onto the metal strip and to obtain a coating of homogeneous thickness.

Figure 1:
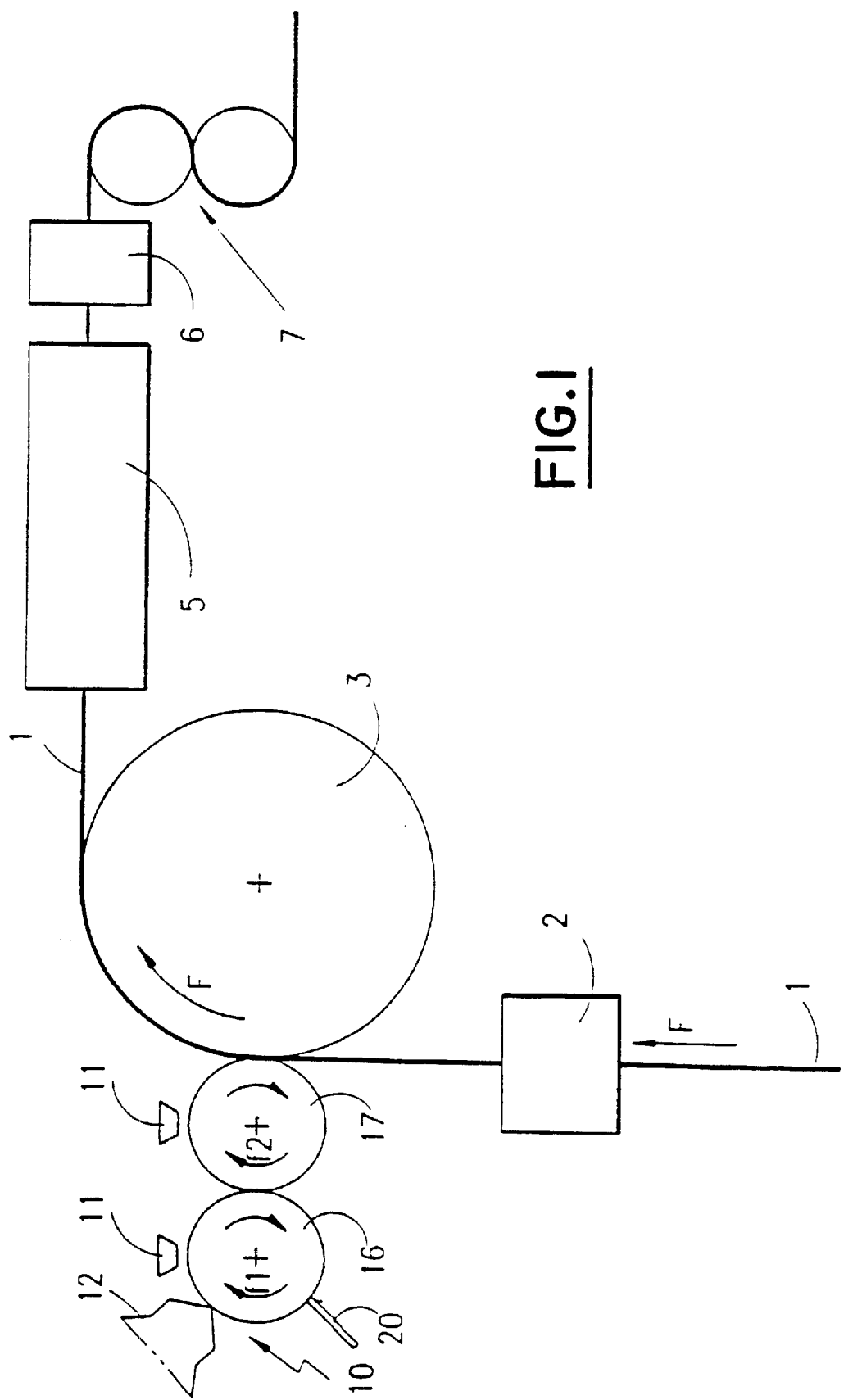
Figure 2:
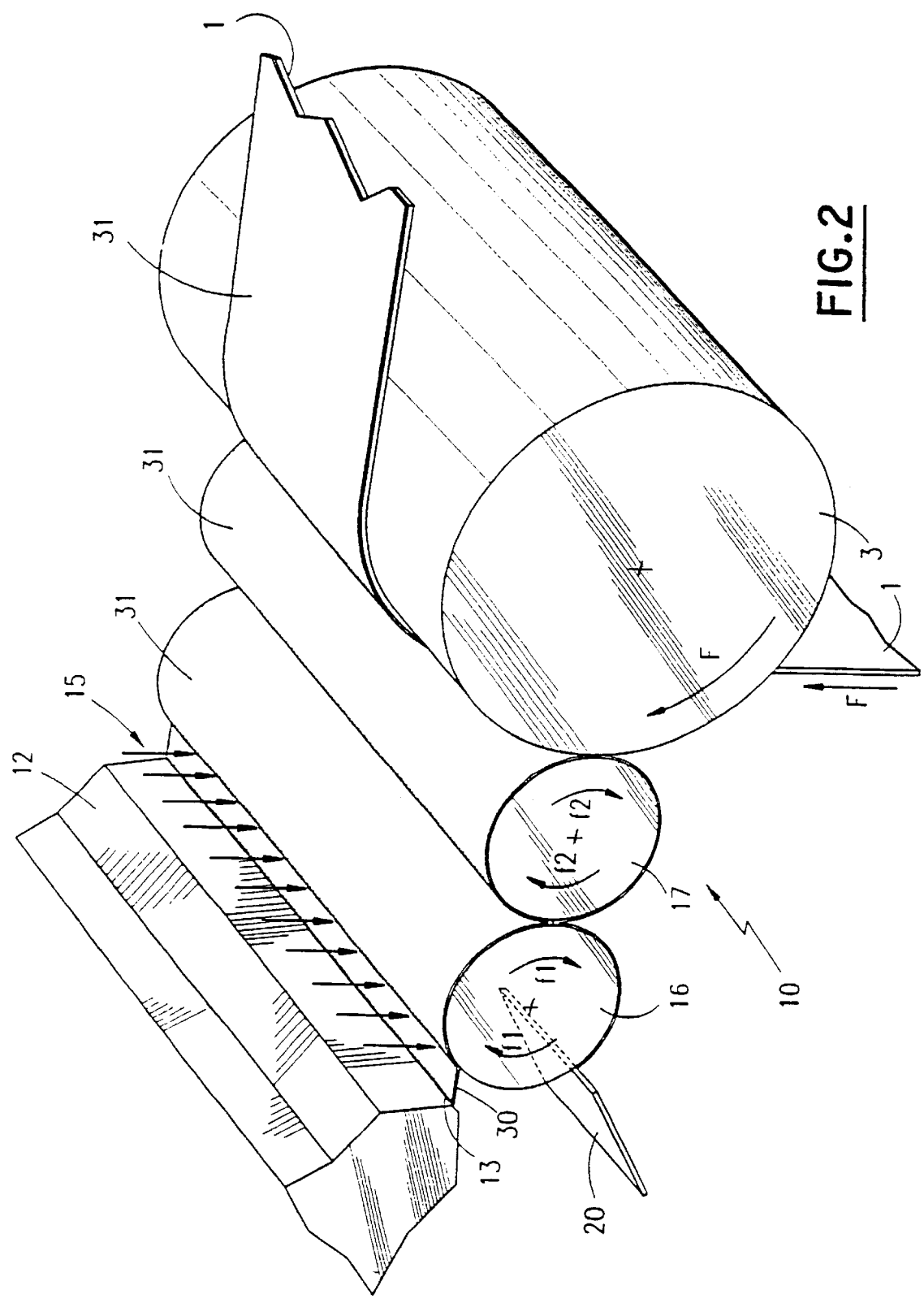
Figure 3:
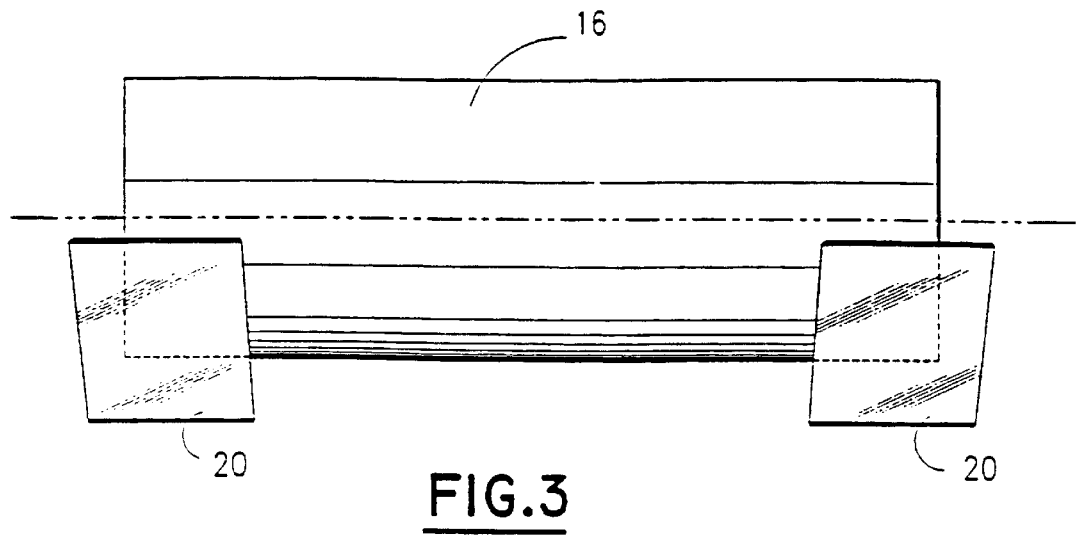
Figure 4:
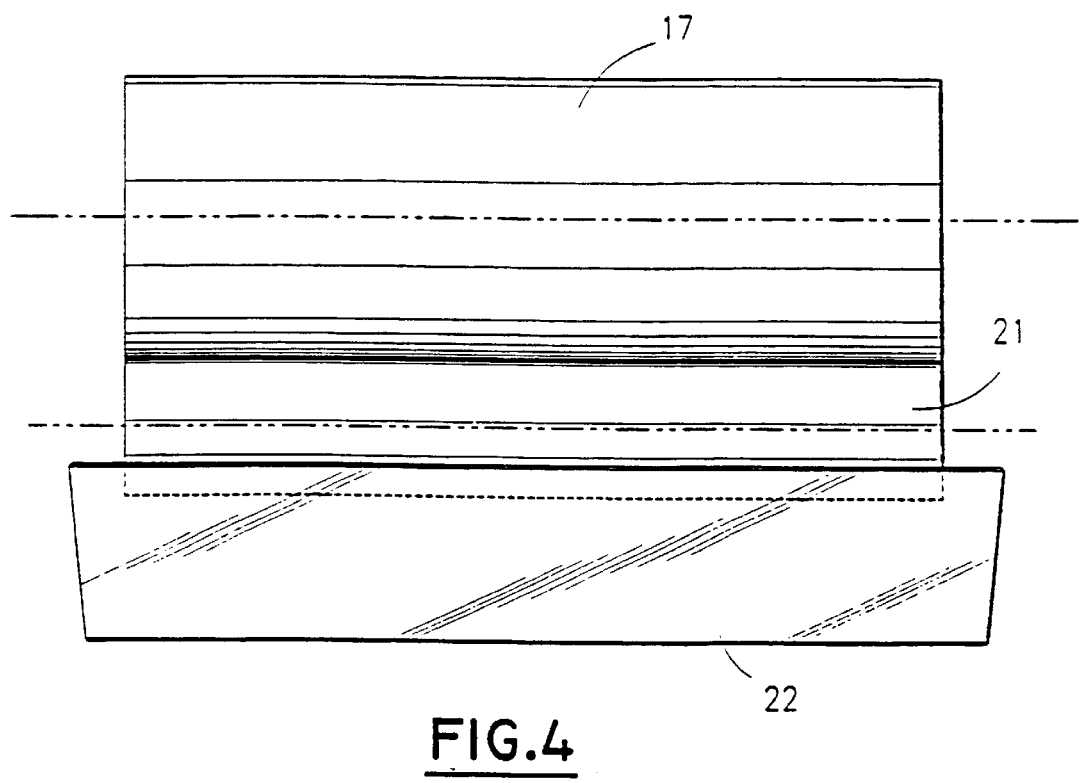

The features and advantages of the invention will emerge during the description which follows, given solely by way of example and with reference to the appended drawings in which:

FIG. 1 is a schematic end view of a plant for coating a metal strip with a film of crosslinkable polymer, comprising an apparatus for applying this coating, according to the invention;

FIG. 2 is a schematic perspective view of the application apparatus according to the invention;

FIG. 3 is a schematic side view of the means for removing excess crosslinkable polymer deposited on the pinch roll of the application apparatus according to the invention;

FIG. 4 is a schematic side view of the means for removing excess crosslinkable polymer deposited on the applicator element of the application apparatus according to the invention.

DESCRIPTION OF THE PREFERRED EMBODIMENT

FIG. 1 shows schematically a plant for the continuous coating of a metal strip 1 with a film of fluid crosslinkable polymer containing neither solvent nor diluent and with a thickness of, for example, between 5 and 50 microns.

This metal strip has a thickness of, for example, between 0.10 and 4 mm and is, for example, made of steel or aluminium or of an aluminium alloy and can be coated or prepainted on one or both of its sides.

The polymer used to coat the metal strip 1 is a polymer containing neither solvent nor diluent and is thermally crosslinkable, such as a thermosetting polymer for example, or physically crosslinkable, such as a photocurable polymer for example.

These polymers have flow-onset, softening, crosslinking-onset and rapid-crosslinking temperatures which are different.

In the example of the plant shown in FIG. 1, the metal strip 1 is driven so as to run in the direction of the arrow F and this metal strip 1 bears against at least one back-up roll 3, for example made of steel.

The plant includes means 2 for preheating the metal strip 1 to a temperature approximately equal to or greater than the temperature of the fluid film of crosslinkable polymer to be deposited on the said metal strip 1 and equal to or greater than the softening temperature of this crosslinkable polymer.

These means 2 for heating the metal strip 1 consist, for example, of at least one induction furnace.

As shown in FIG. 1, the plant also includes, from the upstream end to the downstream end:

a device denoted in its entirety by the reference 10, for coating the metal strip 1 with a film of fluid crosslinkable polymer containing neither solvent nor diluent;

means 5 for curing or crosslinking the film of crosslinkable polymer;

and a unit 7 for hauling off the metal strip.

If the polymer is thermally crosslinkable, the curing means 5 comprise, for example, at least one induction oven and cooling means 6, and if the polymer is physically crosslinkable, the curing means 5 may consist of ultraviolet lamps or of electron beams.

The apparatus 10 for coating the metal strip 1 with a film of fluid crosslinkable polymer will now be described with reference to FIG. 2.

This film of crosslinkable polymer to be deposited on the metal strip 1 must be of uniform thickness, even though this metal strip 1 has thickness heterogeneities or flatness discrepancies as well as significant surface roughness and/or corrugations of amplitude equal to or greater than the thickness of the film deposited on the said metal strip 1.

According to one embodiment illustrated in FIG. 2, the coating apparatus 10 comprises:

means 12, 13 and 15 for forming, on a pinch roll 16 having a hard surface, by forced flow, a homogeneous and uniformly thick sheet 30 of crosslinkable polymer having a viscosity greater than 10 Pa.s under the conditions of formation of the said sheet 30, the said pinch roll 16 forming a film 31 of crosslinkable polymer with a uniform thickness approximately equal to the desired thickness;

and an applicator element 17 in contact with the pinch roll 16 and with the metal strip 1 and intended to transfer the said film 31 firstly from the pinch roll 16 onto the applicator element 17 and secondly from the said applicator element 17 onto this metal strip 1 so as to obtain a coating of homogeneous thickness.

The means for forming, by forced flow, the sheet 30 of crosslinkable polymer comprise an extruder, not shown, of conventional type, provided with a die 12 having an extrusion slot 13 and a flow regulator, not shown, consisting, for example, of a metering pump placed between the extruder and the die 12.

The pinch roll 16 has a hard, machined or ground, surface and is positioned very accurately so as to present a perfectly uniform geometry with optimum parallelism with respect to the extrusion slot 13 of the die 12.

This pinch roll 16 has a hard metal surface such as, for example, one based on coated or bare steel or based on a ceramic material.

The pinch roll 16 is heated to a temperature approximately equal to or greater than, on the one hand, the temperature of the sheet 30 and, on the other hand, the softening temperature of the crosslinkable polymer and is driven in rotation, by suitable means, not shown, in the same direction as the back-up roll 3 supporting the metal strip 1, as shown by the arrows f1 in FIG. 2.

The sheet 30 of the said crosslinkable polymer on the pinch roll 16 is formed, for example, by extrusion coating or by extrusion lamination.

In the case of extrusion coating, the means for forming the sheet 30 by forced flow are formed by the die 12 bearing against the surface of the pinch roll 16 and provided with means, of the conventional type, for adjusting the position of the edges of the extrusion strip 13 of the said die 12 with respect to the said surface of the pinch roll 16.

In the case of extrusion lamination, the means for forming the sheet 13 by forced flow are formed by the die 12, means for drawing the sheet 30 by adjusting the output from the die 12 and/or by adjusting the speed of rotation of the pinch roll 16, means, of conventional type, for adjusting the position of the edges of the extrusion slot 13 of the said die 12 with respect to the surface of the pinch roll 16 and by means 15 for pressing the sheet 30 against the said surface of the pinch roll 16.

The means 15 for pressing the sheet 30 against the surface of the pinch roll 16 are formed by an air knife, directed towards the pinch roll 16 along the contact generatrix of the said sheet 30 on the said pinch roll 16, or by electrostatic pressing means.

In the case of electrostatic pressing means, the pinch roll 16 is necessarily made of metal.

The film 31 of crosslinkable polymer, as soon as it comes into contact with the pinch roll 16, has a uniform thickness approximately equal to the desired thickness for the coating on the metal strip 1.

The die 12 of the extruder 11 uniformly distributes the sheet 30, and consequently the film 31, and the thickness of this film 31 is obtained by varying the speed of rotation of the pinch roll 16 and/or of the applicator element 17 and by varying the speed at which the metal strip 1 runs.

The applicator element 17 has a deformable surface and is compressed between the pinch roll 16 and the metal strip 1 bearing on the back-up roll 3.

In the illustrative embodiment shown in FIGS. 1 and 2, the applicator element 17 is formed by a roll coated with a deformable material such as, for example, an elastomer.

In an alternative embodiment, the applicator element is formed by an endless belt which may be coated with a deformable material such as, for example, an elastomer.

The invention will be described below using an applicator element consisting of a roll.

The applicator roll 17, heated to a temperature approximately equal to or greater than the temperature of the pinch roll 16, is driven in rotation in the same direction as the back-up roll 3 supporting the metal strip 1, as shown by the arrows f2 in FIG. 2.

The pinch roll 16 and the applicator roll 17 are heated, for example, by at least one internal source, placed in each roll and consisting of a circulation of a fluid, electrical resistance elements or infrared lamps, or by at least one external source 11 placed near the transfer regions and consisting of hot-air generators or infrared lamps.

In addition, the coating apparatus 10 comprises means, not shown, of conventional type, for adjusting the tangential speeds of the pinch roll 16 and of the applicator roll 17 in a ratio of between 0.5 and 2 times the speed at which the metal strip 1 runs.

The speeds of the pinch roll 16 and of the applicator roll 17 may be adjusted independently of each other.

The coating apparatus 10 also comprises means, not shown, for adjusting the contact pressure firstly between the pinch roll 16 and the applicator roll 17 and secondly between the applicator roll 17 and the metal strip 1. These means consist, for example, of hydraulic cylinders or of screw/rack systems, and make it possible to adjust the contact pressures depending on the viscosity of the crosslinkable polymer so as to ensure complete transfer of the material and to minimize the frictional forces.

The back-up roll 3 supporting the metal strip 1 is made of steel or of elastomer.

As shown in FIG. 2, the pinch roll 16, the applicator roll 17 and the back-up roll 3 have a length greater than the width of the metal strip 1.

According to an alternative embodiment, the applicator roll 17 may have a length of less than the length of the pinch roll 16.

The thin fluid film 31 of thermally or physically crosslinkable polymer is applied, in the illustrative embodiment shown in the figures, in the following manner.

The metal strip 1 is maintained at a temperature equal to or greater than the softening temperature of the crosslinkable polymer and the pinch roll 16 and applicator roll 17 are driven in rotation in the same direction as the back-up roll 3 supporting the metal strip 1.

At the exit of the die 12 of the extruder, the sheet 30 formed by forced flow is pressed against the pinch roll 16 so as to form the film 31 of crosslinkable polymer with a uniform thickness corresponding approximately to the thickness of the coating to be formed on the metal strip 1.

The temperatures of the pinch roll 16 and/or applicator roll 17 are adjusted in order to optimize the viscosity of the crosslinkable polymer during its transfer onto the said rolls.

Because of the pressure exerted by the pinch roll 16 and the metal strip 1 on the applicator roll 17 having a deformable surface, the film 31 is transferred from the pinch roll 16 onto the applicator roll 17 and from this applicator roll 17 onto the surface of the metal strip 1 to be coated.

Next, the metal strip 1 thus coated passes through the preheating means 4 and then through the heating means 5 so as to cure the film 31 of crosslinkable polymer.

This film 31 of crosslinkable polymer may be deposited on a bare metal strip, made of steel or aluminium or aluminium alloy, or on a precoated or prepainted metal strip.

The coating thus produced on the metal strip 1 has, for example, a thickness of between 5 and 50 microns with a thickness uniformity of a few microns, despite the appreciable discrepancies in the flatness or thickness heterogeneity of the metal strip 1.

Other means for forming the sheet 30 by forced flow may also be used.

Thus, the means for forming the sheet 30 by forced flow may be formed by a rigid block of crosslinkable polymer applied with controlled pressure, in order to deposit particles of crosslinkable polymer onto the pinch roll 16 and form the sheet 30, or else by a system for transferring a powder of crosslinkable polymer onto this pinch roll 16, using an electrostatic field, in order to form the said sheet 30.

According to other alternative embodiments, the means for forming the sheet 30 by forced flow may be formed by a system for spraying a fluid crosslinkable polymer onto the pinch roll 16 or by a system for applying a continuous web of crosslinkable polymer, produced beforehand in order to form the sheet 30, to this pinch roll 16.

According to yet another alternative embodiment, the means for forming the sheet 30 by forced flow may be formed by a rotating bar placed between the die 12 and this pinch roll 16.

The sheet 30 and the film 31 of crosslinkable polymer may have a width of less than the width of the metal strip 1 in order to coat only part of this metal strip 1 or a width greater than the width of this metal strip 1 in order to coat the said metal strip 1 in its entirety.

If the sheet 30 and the film 31 have a width greater than the metal strip 1, as shown in FIG. 2, there is, on either side of the useful zone of application to the said metal strip 1, a portion of crosslinkable polymer which is not applied to this metal strip 1.

This excess crosslinkable polymer has to be removed so as to prevent it from creating an additional thickness on the applicator roll 17 or on the pinch roll 16.

This is because, given the space existing between the applicator roll 17 and the back-up roll 3 on either side of the metal strip 1 and because of the thickness of this metal strip 1, the excess crosslinkable polymer remains on the applicator roll 17.

In order to remove this excess material, two solutions may be envisaged.

The first solution consists in equipping the pinch roll 16 with means for removing the excess crosslinkable polymer.

This excess material that has not been deposited on the metal strip 1 remains on the applicator roll 17 and is transferred to the pinch roll 16 because of the pressure exerted on the deformable surface of the applicator roll 17.

In this case, the means for removing the excess crosslinkable polymer deposited on the leader roll 16 are formed by at least one scraper 20, for example made of metal, in contact with the pinch roll 16.

According to one illustrative embodiment, shown in FIG. 3, the means for removing the excess crosslinkable polymer deposited on the pinch roll 16 are formed by two scrapers 20, for example made of metal, each in contact with a lateral edge of the pinch roll 16 upstream of the application generatrix of the sheet 30 on this pinch roll 16.

Preferably, the transverse position of the scrapers 20 on the pinch roll 16 is slaved, by suitable means, not shown, to the width of the metal strip 1 and/or to the transverse position of this metal strip 1 on the back-up roll 3.

This is because the position of this metal strip 1 on this back-up roll 3 may vary.

The scrapers 20 are therefore in contact with the pinch roll 16 and remove the excess crosslinkable polymer by rubbing against the said roll 16.

The second solution consists in equipping the applicator roll 17 with means for removing the excess crosslinkable polymer.

As shown in FIG. 4, these means for removing the excess crosslinkable polymer on the applicator roll 17 are formed by a recovery roll 21, preferably made of metal, in contact with the applicator roll 17 and by at least one scraper 22 in contact with the said recovery roll 21.

Thus, the excess crosslinkable polymer deposited on the applicator roll 17 is transferred onto the recovery roll 21 because of the pressure exerted by the said recovery roll on the deformable surface of the said applicator roll 17 and this excess crosslinkable polymer is removed from the recovery roll 21 by the scraper 22.

According to another embodiment, the means for removing the excess crosslinkable polymer on the applicator roll 17 may be formed by a recovery roll 21 and by two scrapers each in contact with one lateral edge of the said applicator roll 17.

The means for removing the excess crosslinkable polymer deposited on the applicator roll 17 or on the pinch roll 16 avoid having to add inserts into the slot 13 of the extrusion die 12 so as to size the sheet 30 of crosslinkable polymer as soon as it leaves the die 12 and to accommodate variations in the width and transverse positioning of the metal strip 1 within the predefined tolerance limits.

According to an alternative embodiment, the point of application of the film 31 of crosslinkable polymer may be located at a place other than facing the back-up roll 3 supporting the metal strip 1, for example on a taut free strand of this metal strip 1 downstream of the said back-up roll 3.

According to another alternative embodiment, both faces of the metal strip 1 may be coated with a film 31 of crosslinkable polymer.

In this case, an apparatus 10 for applying the film 31 is placed on one side of the metal strip 1 and another apparatus 10 for applying the film 31 is placed on the other side of the said metal strip 1.

Moreover, the crosslinkable polymer may be pigmented and filled, for example with 40% and more by weight of titanium oxide.

By way of example, the crosslinkable polymer compound is formulated as follows:

85% by weight of a polyester polyol called URALAC P1460 from DSM Resins (The Netherlands) having the following characteristics:

average number of —OH per molecule: $F_{ol.av}=3$ hydroxyl number of the polyol: $I_{OH}=37$ to 47 average molar mass (by weight) $M_w=20,000$ g/mol average molar mass (in number of molecule) $M_n=4090$ polydispersity index $M_w/M_n$: $I_p=4.9$ (the hydroxyl number of the polyol, $I_{OH}$, being defined as the necessary amount of potassium—in mg—to neutralize all the hydroxyl functional groups; therefore:

$F_{ol,av}=I_{OH}\times M_n/56100$);

as hardener, 15% by weight of a blocked isocyanate called VESTAGON BF 1540 from HULS, essentially consisting of IPDI uretidione;

average number of —NCO per molecule: $F_{iso:av}=2$ melting point between 105° C. and 115° C.

crosslinking deblocking temperature=160° C.

total amount of NCO radicals=14.7 to 16% by weight proportion of free (unblocked) NCO radicals<1% by weight;

for a shear rate of 10 s$^{-1}$, the viscosity is:

900 Pa.s at 120° C.

400 Pa.s at 130° C.

180 Pa.s at 140° C.

80 Pa.s at 150° C.

This compound is entirely in the fluid and/or viscous state above a temperature of 120° C. and its rapid-crosslinking temperature is between 170° C. and 250° C.

The coating apparatus according to the invention makes it possible, by the use of an applicator element having a deformable surface, to obtain a coating of crosslinkable polymer with a uniform thickness applied homogeneously to a metal strip exhibiting significant roughness of amplitude comparable to the thickness of the film, by means of the perfect contact between the applicator element and the surface of the metal strip to be coated, despite the discrepancies in flatness and in thickness heterogeneity of the said metal strip.

The speed of the applicator element may be adjusted to a level substantially greater than the speed at which the metal strip runs so as to obtain perfect continuity of the coating and an excellent surface finish of this coating of crosslinkable polymer transferred to this metal strip.

The coating apparatus according to the invention may also be used for a downward or horizontal metal strip.

Moreover, the coating apparatus according to the invention makes it possible to be able to continuously coat metal strips of different widths and to simultaneously coat several metal strips placed parallel to each other and to overcome the problem of fluctuations in the width and transverse positioning of the metal strip or strips by simple and effective means.

The coating apparatus according to the present invention makes it easier for the coating of crosslinkable polymer to be fed in a regular and uniform manner by selecting the feed mode best suited, depending on the product to be employed.

The advantage of this wide choice is particularly great in the case of highly reactive thermosetting coatings which cannot be fed at a high temperature close to the reactivity range.

This apparatus also makes it possible, in the case of a chemical crosslinking process, to raise the temperature of the coating of crosslinkable polymer so as to reduce its viscosity and make it easier for it to be transferred onto and spread out over the metal strip.

This is because the temperature of the material delivered by the feed system located upstream of the pinch roll is limited to a value below that of the onset of crosslinking in order to avoid any risk of evolution from the product in the feed system.

Because of this temperature limitation, it is impossible to reduce the viscosity of the product to a level low enough to make it easier to transfer it onto and properly spread it out over the metal strip. During contact with the heated rolls, the material to be transferred undergoes very considerable heating but only for a very short time, thereby avoiding any risk of crosslinking of the product at this point.

Finally, the apparatus according to the invention makes it possible to compensate for fluctuations in width or in transverse position of the metal strip during the application and to get round the problems of lack of uniformity of the metal strip and to produce a surface coating of uniform thickness on a non-uniform metal substrate.

We claim:

1. Process for the continuous coating of at least one metal strip with a fluid film of crosslinkable polymer containing neither solvent nor diluent, the fluid film having a thickness of less than that of the metal strip, characterized in that:

the metal strip is made to run continuously over at least one back-up roll;

the metal strip is preheated to a temperature that is approximately equal to or greater than the temperature of the fluid film of the crosslinkable polymer and is equal to or greater than the softening temperature of the crosslinkable polymer;

a homogenous and uniformly thick sheet of the said crosslinkable polymer is formed by extrusion coating on a pinch roll having a hard surface, the crosslinkable polymer having a viscosity greater than 10 Pa.s under the conditions of formation of the sheet, the pinch roll being heated to a temperature that is approximately equal to or greater than the temperature of the sheet and that is equal to or greater than the softening temperature of the crosslinkable polymer and being driven in rotation in the same direction as the back-up roll supporting the metal strip, and the film of crosslinkable polymer is formed with a uniform thickness approximately equal to the desired thickness;

an applicator element having a deformable surface is compressed between the pinch roll and the metal strip, the applicator element being heated to a temperature approximately equal to or greater than the temperature of the pinch roll and being driven in rotation in the same direction as the back-up roll supporting the metal strip, in order to transfer this film first from the pinch roll onto the applicator element and second from the applicator element onto the metal strip to obtain a coating of homogeneous thickness, the temperatures of at least one of the pinch roll and of the applicator element being adjusted in order to optimize the viscosity of the crosslinkable polymer during transfer onto the pinch roll and onto the applicator element.

2. Coating process according to claim 1, characterized in that any crosslinkable polymer deposited in excess on the pinch roll is removed.

3. Coating process according to claim 1, characterized in that any crosslinkable polymer deposited in excess on the applicator element is removed.

* * * * *